United States Patent
Ferri, II

(10) Patent No.: US 10,769,321 B2
(45) Date of Patent: Sep. 8, 2020

(54) PIPELINE DESIGN AND LAYOUT SYSTEM AND METHOD THEREFOR

(71) Applicant: Alex E. Paris Contracting Co., Inc., Atlasburg, PA (US)

(72) Inventor: Armando Ferri, II, Cranberry Township, PA (US)

(73) Assignee: Alex E. Paris Contracting Co., Inc., Atlasburg, PA (US)

( * ) Notice: Subject to any disclaimer, the term of this patent is extended or adjusted under 35 U.S.C. 154(b) by 910 days.

(21) Appl. No.: 15/077,436

(22) Filed: Mar. 22, 2016

(65) Prior Publication Data

US 2016/0283613 A1 Sep. 29, 2016

Related U.S. Application Data

(60) Provisional application No. 62/137,936, filed on Mar. 25, 2015.

(51) Int. Cl.
| | | |
|---|---|---|
| G06F 30/20 | (2020.01) | |
| G06F 30/13 | (2020.01) | |
| G06F 30/17 | (2020.01) | |
| G06F 30/18 | (2020.01) | |
| G06F 113/14 | (2020.01) | |

(52) U.S. Cl.
CPC .............. *G06F 30/20* (2020.01); *G06F 30/13* (2020.01); *G06F 30/17* (2020.01); *G06F 30/18* (2020.01); *G06F 2113/14* (2020.01)

(58) Field of Classification Search
CPC ........................... G06F 17/5009; G01V 11/00
See application file for complete search history.

(56) References Cited

U.S. PATENT DOCUMENTS

| | | |
|---|---|---|
| 2003/0023412 A1 | 1/2003 | Rappaport et al. |
| 2007/0229508 A1 | 10/2007 | Connor et al. |
| 2013/0311145 A1 | 11/2013 | Detwiler et al. |
| 2014/0200864 A1* | 7/2014 | Bauschke ............... G06F 30/00 703/1 |
| 2015/0269288 A1* | 9/2015 | Moore .................... G06F 30/13 703/1 |

OTHER PUBLICATIONS

Bill Wilkins et al., "AEP Medusa4 Pipe Design User Guide," Jan. 5, 2015, CAD Schroer US Inc., 26 pages.*
"Constitution Pipeline," Jan. 16, 2014, Wayback Machine for http://constitutionpipeline.com/construction/, 6 pages.*
(Continued)

*Primary Examiner* — Kamini S Shah
*Assistant Examiner* — Russ Guill
(74) *Attorney, Agent, or Firm* — Duane Morris LLP

(57) ABSTRACT

The present disclosure describes systems and methods for designing a pipeline. Embodiments include receiving input pipeline design information and GPS input information from a construction site, designing a pipeline layout and pipeline fabrication details from the input pipeline design information and the GPS input information, and providing GPS and pipeline construction output information to be used in the field to excavate a ditch line and construct the pipeline so that the installation and the fabrication of the pipe matches the excavate ditch.

27 Claims, 12 Drawing Sheets

(56) References Cited

OTHER PUBLICATIONS

Mike Choquette, "CAD clinic: Editing Alignments with Civil 3D," 2006, cadalyst, Nov. 2006, 4 pages (Year: 2006).*

"Using Hydraflow storm sewers extension with AutoCad civil 3d 2008," 2008, AutoCAD, 20 pages (Year: 2008).*

"AutoCad Civil 3D 2011 Tutorials," 2010, AutoDesk, 840 pages (Year: 2010).*

Phillip Zimmerman, "Harnessing AutoCad Civil 3d 2011," 2011, "Chapter 11 Pipe Networks," Cengage Learning, 36 pages (Year: 2011).*

Jianchun He et al., "Layout optimization of urban underground pipeline based on 3d digital city," 2010, The International Archives of the Photogrammetry, Remote Sensing and Spatial Information Sciences, vol. 38, Part II, 5 pages (Year: 2010).*

Trevor Clayton, "Pipe Networks," 2013, CADline Ltd, 8 pages (Year: 2013).*

D.A. Savic et al., "Genetic algorithms for least-cost design of water distribution networks," 1997, ASCE Journal of Water Resources Planning and Management, vol. 123, No. 2, 43 pages (Year: 1997).*

"Isodraft User Guide," 2013, Aveva Solutions Ltd., 137 pages (Year: 2013).*

Sepehr Sanaye et al., "Optimal design of a natural gas transmission network layout," 2013, Chemical Engineering Research and Design, vol. 91, pp. 2465-2476 (Year: 2013).*

R.R. de Lucena et al., "Optimization of pipeline routes using an AIS/Adaptive penalty method," 2012, Proceedings of the Eighth International Conference on Engineering Computational Technology, 17 pages (Year: 2012).*

"Proceedings of the Reaps Technical Symposium," 1979, IIT Research Institute, 547 pages (Year: 1979).* uniservice-europe.co.uk: "Design of gas distribution networks, PpoektipoBahie Gazopacppedelitelbhyx cetei", Jun. 19, 2012, 2pgs., XP054978744, Retrieved from the Internet: URL:https://web.archive.org/web/20120619040322/http://www.uniservice-europe.co.uk/rus/truboprovod/tutorial/grp.wmv [retrieved on Oct. 3, 2018].

O'Reilly—Video Training: "AutoCAD Civil 3D Tutorial: Laying out a Pipe Network: Infinite Skills", Aug. 29, 2012, 2pgs., XP054978746, Retrieved from the Internet: URL:https://www.youtube.com/watch?v=u8XbzsKtNA4 [retrieved on Oct. 3, 2018].

European Patent Office, Extended European Search Report for corresponding EP Application No. 16769551 dated Oct. 12, 2018, 1pg.

International Bureau WIPO, International Preliminary Report on Patentability for corresponding International Application No. PCT/US16/23601 dated Sep. 26, 2017, 9pgs.

International Searching Authority, International Search Report for corresponding Application No. PCT/US16/23601 dated Jun. 16, 2016, 1pg.

* cited by examiner

Raw Material

| Uncut Length (ft) | Name | Cut Length (ft) | Cut Off (ft) |
|---|---|---|---|
| 42.20 | 1 | 36.07 | 6.13 |
| 42.40 | 2 | 42.40 | 0.00 |
| 41.80 | 3 | 41.80 | 0.00 |
| 41.90 | 4 | 41.90 | 0.00 |
| 42.10 | 5 | 31.39 | 10.71 |
| 42.00 | 6 | 42.00 | 0.00 |
| 42.00 | 7 | 32.14 | 9.86 |
| 42.00 | 9 | 38.24 | 3.76 |
| 42.00 | 10 | 42.00 | 0.00 |
| 42.00 | 11 | 42.00 | 0.00 |
| 42.00 | 12 | 29.25 | 12.75 |
| 42.00 | 13 | 42.00 | 0.00 |
| 42.00 | 14 | 42.00 | 0.00 |
| 42.00 | 15 | 42.00 | 0.00 |
| 42.00 | 16 | 42.00 | 0.00 |
| 42.00 | 17 | 36.54 | 5.46 |

Uncut length (ft): 42
Pipe name prefix:

Parts List

| Name | Type | Description |
|---|---|---|
| 1 | Pipe Section | Cut length: 36.07 ft |
| 2 | Pipe Section | Cut length: 42.40 ft |
| 3 | Pipe Section | Cut length: 41.80 ft |
| 4 | Pipe Section | Cut length: 41.90 ft |
| 5 | Pipe Section | Cut length: 31.39 ft |
| 6 | Pipe Section | Cut length: 42.00 ft |
| 7 | Pipe Section | Cut length: 32.14 ft |
| 8 | Tube Turn | TDA: 37.58 deg, Radius: 4.00 ft |
| 9 | Pipe Section | Cut length: 38.24 ft |
| 10 | Pipe Section | Cut length: 42.00 ft |
| 11 | Pipe Section | Cut length: 42.00 ft |
| 12 | Pipe Section | Cut length: 29.25 ft |
| 13 | Pipe Section | Cut length: 42.00 ft |
| 14 | Pipe Section | Cut length: 42.00 ft |
| 15 | Pipe Section | Cut length: 42.00 ft |
| 16 | Pipe Section | Cut length: 42.00 ft |

Layout results: Layout successful: 16 of 16 pipes laid out, 0 pipes unused.

Pipes | Bis | Cancel | Help

*FIG. 6A*

```
                    PD_Layout_Design_corridor_BI.txt

Pipe Bending Instructions
                         ═════════════════════════

Design drawing  : PD_Layout_Design_corridor
       Pipe diameter   : 16.00 in (1 ft 4 in)
       Quarter turn    : 12.57 in (1 ft 0 in & 9/16 in)
       ═══════════════════════════════════════════════════════════════
       Pipe: 1
           Length     : 42.20 ft (42 ft 2 in & 3/8 in)
           Cut Length : 36.07 ft (36 ft 0 in & 13/16 in)

Straight pipe - No bends required
       ═══════════════════════════════════════════════════════════════
       Pipe: 2
           Length     : 42.40 ft (42 ft 4 in & 13/16 in)
           Cut Length : 42.40 ft (42 ft 4 in & 13/16 in)

Bend No: 1
               Bend center                : 8.13 ft (8 ft 1 in & 1/2 in)
               Measure direction          : Left
               Measure distance           : 25.13 in (2 ft 1 in & 1/8 in)
               Center bend radius         : 38.20 ft (38 ft 2 in & 3/8 in)
               Center curvature           : 1.50 deg/ft (1 deg/ft & 1/2 deg/ft)
               Total deflection angle     : 9.55 deg (9 deg & 1/2 deg)
               Horizontal deflection angle: 0.00 deg (0 deg)
               Vertical deflection angle  : 9.55 deg (9 deg & 1/2 deg) overbend
           Bend No: 2
               Bend center                : 32.64 ft (32 ft 7 in & 11/16 in)
               Measure direction          : None
               Measure distance           : 0.00 in (0 ft 0 in)
               Center bend radius         : 38.20 ft (38 ft 2 in & 3/8 in)
               Center curvature           : 1.50 deg/ft (1 deg/ft & 1/2 deg/ft)
               Total deflection angle     : 6.14 deg (6 deg & 1/4 deg)
               Horizontal deflection angle: 0.00 deg (0 deg)
               Vertical deflection angle  : 6.14 deg (6 deg & 1/4 deg) sag
       ═══════════════════════════════════════════════════════════════
       Pipe: 3
           Length     : 41.80 ft (41 ft 9 in & 5/8 in)
           Cut Length : 41.80 ft (41 ft 9 in & 5/8 in)

Bend No: 1
               Bend center                : 21.02 ft (21 ft 0 in & 5/16 in)
               Measure direction          : Left
               Measure distance           : 17.60 in (1 ft 5 in & 5/8 in)
               Center bend radius         : 38.20 ft (38 ft 2 in & 3/8 in)
               Center curvature           : 1.50 deg/ft (1 deg/ft & 1/2 deg/ft)
               Total deflection angle     : 11.16 deg (11 deg & 1/4 deg)
               Horizontal deflection angle: 9.06 deg (9 deg) left
               Vertical deflection angle  : 6.54 deg (6 deg & 1/2 deg) overbend
       ═══════════════════════════════════════════════════════════════
       Pipe: 4
           Length     : 41.90 ft (41 ft 10 in & 13/16 in)
           Cut Length : 41.90 ft (41 ft 10 in & 13/16 in)

Straight pipe - No bends required
       ═══════════════════════════════════════════════════════════════
       Pipe: 5
           Length     : 42.10 ft (42 ft 1 in & 3/16 in)
           Cut Length : 31.39 ft (31 ft 4 in & 5/8 in)

Straight pipe - No bends required
                                                              Page 1
```

FIG. 7

PIPELINE DESIGN AND LAYOUT SYSTEM AND METHOD THEREFOR

RELATED AND CO-PENDING APPLICATIONS

This application claims priority to co-pending U.S. provisional application entitled "Pipeline Layout System", Ser. No. 62/137,936 filed 25 Mar. 2015, the entirety of which is hereby incorporated herein by reference.

BACKGROUND

Prior art systems and methods for designing and laying out a pipeline require the creation of tedious two-dimensional hand-drawn plan diagrams using manual surveys of the terrain with or without the assistance of satellite positioning systems, such as the Global Positioning System ("GPS"). These methods are cumbersome, slow, and result in inaccuracies that raise the cost of designing and physically laying out a pipeline due to the fact that the plans could not effectively be used to accurately determine the amount of pipe needed or correctly identify the location and size of pipe bends required.

Some prior art systems and methodologies took the approach of marrying together a hand-drawn plan view 2D pipeline path with a corresponding hand-drawn profile view 2D pipeline path to determine the overall pipeline path in 3D. This technique typically results in a complex 3D pipeline path which often contains curves which were non-planar. Non-planar curves require pipe bends where the pipe curves radially in both the plan view and the profile view thereby defining a complex twisting curve in 3D. These types of curves cannot be manufactured using conventional pipe bending machines.

Furthermore, the inaccuracies and delays inherent in determining a pipeline design and layout using the prior art methods result in increased time and cost for a particular pipeline job due to one or more of ordering too much or too little raw pipe, requiring expensive exotic pipe bends that typically cannot be done in the field, an inability to minimize the number of bends, generating incorrect bending instructions from the design drawings, digging ditches that are too shallow or off-course, etc.

Accordingly, there is a need for a faster, more efficient, reliable, and more accurate pipeline design and layout system rather than relying on rules of thumb, guesswork, and/or general experience. Additionally, there is a need for a system, method, and software embodied on a non-transitory machine-readable medium that can receive GPS input information from a construction site, design the layout and pipeline fabrication details from the GPS input information, and then provide GPS and pipeline construction output information to be used in the field to construct the pipeline so that the installation and the fabrication of the pipe matches the ditch line to be excavated.

BRIEF DESCRIPTION OF THE DRAWINGS

FIG. 6A is an exemplary input screen for a pipe section layout according to an embodiment of the present subject matter.

FIG. 7 is a portion of an exemplary output text file for pipe fabrication information according to an embodiment of the present subject matter.

DETAILED DESCRIPTION

Figure 1:
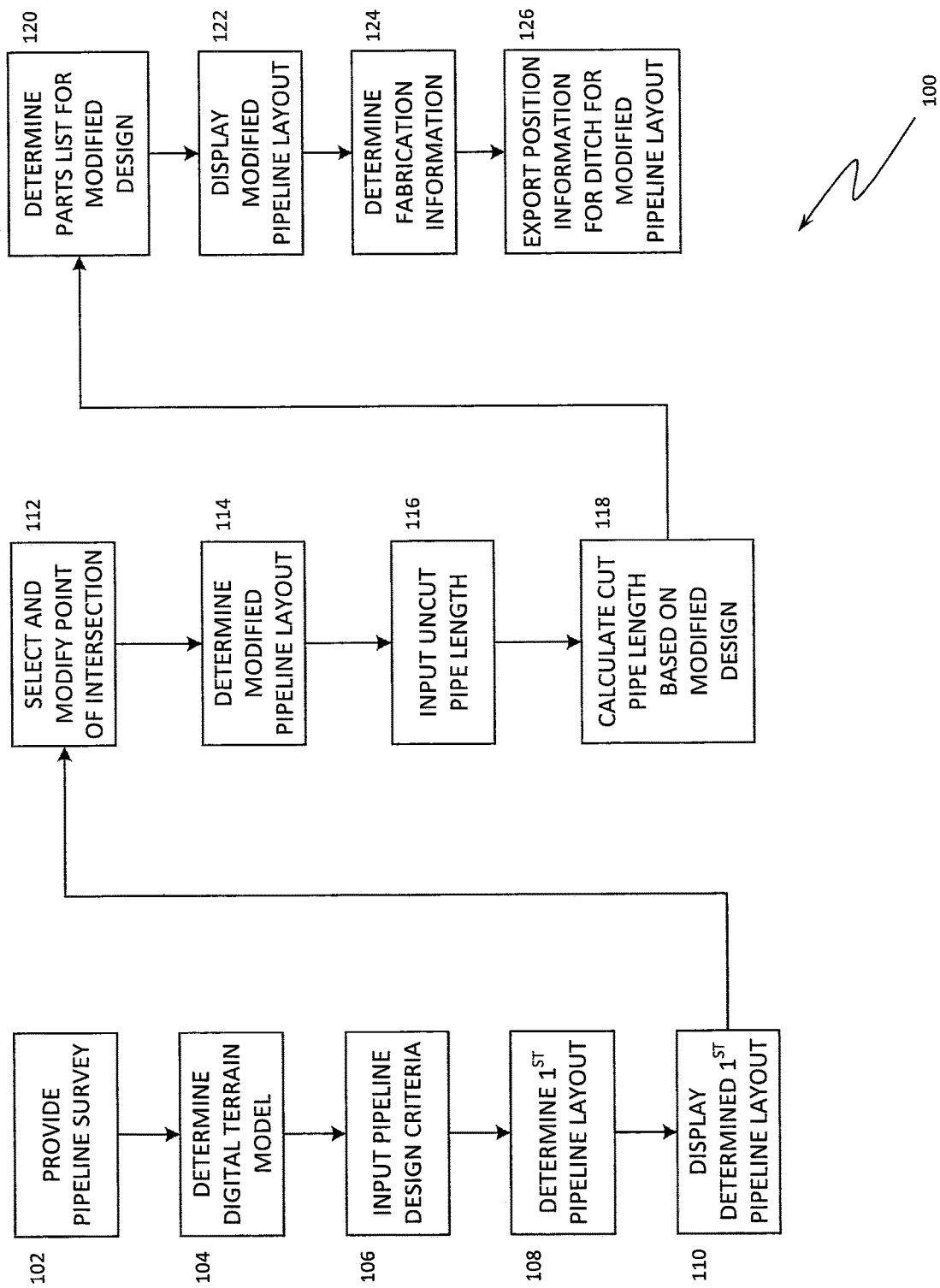
FIG. 1 is a flow chart for a method for designing a pipeline layout according to an embodiment of the present subject matter.

The following description of the present subject matter is provided as an enabling teaching of the present subject matter and its best, currently-known embodiment. Those skilled in the art will recognize that many changes can be made to the embodiments described herein while still obtaining the beneficial results of the present subject matter. It will also be apparent that for some embodiments, some of the desired benefits of the present subject matter can be obtained by selecting some of the features of the present subject matter without utilizing other features. Accordingly, those skilled in the art will recognize that many modifications and adaptations of the present subject matter are possible and may even be desirable in certain circumstances and are part of the present subject matter. Thus, the following description is provided as illustrative of the principles of the present subject matter and not in limitation thereof and may include modification thereto and permutations thereof. While the following exemplary discussion of embodiments of the present subject matter may be directed towards or reference specific pipeline designs and/or layouts, it is to be understood that the discussion is not intended to limit the scope of the present subject matter in any way and that the principles presented are equally applicable to other pipeline designs and/or layouts following the teachings herein.

Those skilled in the art will further appreciate that many modifications to the exemplary embodiments described herein are possible without departing from the spirit and scope of the present subject matter. Thus, the description is not intended and should not be construed to be limited to the examples given but should be granted the full breadth of protection afforded by the appended claims and equivalents thereto.

With reference to the figures where like elements have been given like numerical designations to facilitate an understanding of the present subject matter, various embodiments of a system and method for pipeline design and layout are described.

Embodiments of the present subject matter enable a user to design a pipeline in a short amount of time, to exact dimensions, meeting specific criteria, and to produce an outcome where the pipeline to be constructed matches the ditch line to be excavated. These embodiments allow a user to design and/or construct the pipeline and ditch line in any order they deem necessary with the confidence that the results of the two processes will match. Additionally, the user and/or system may develop and manipulate the pipeline design in real time and automatically determine the exact requirements as to how the raw materials are to be fabricated or inserted during construction. Prior art systems and methods do not allow for such fast, reliable connection between current field conditions, the pipeline design requirements, and installation processes together while at the same time maintaining extreme accuracy and flexibility.

The present subject matter includes a pipeline layout system which enables the design of pipelines using a plan view (to specify the route of the pipeline as seen from above) and a profile view (to specify the depth of the pipeline beneath the surface of the prevailing undulating terrain). The profile view is a specialized "vertically unfolded" sectional view of the terrain that lies directly beneath the plan view route of the pipeline. Certain benefits can be realized by the use of embodiments of the present subject matter described herein. One exemplary benefit incorporates facilitating the design of a pipeline that includes only straight and radially curving pipe. Any other shape of curved pipe (e.g., elliptical, twisted, spiral, and generally any type of curve that does not occur in a single plane) is avoided as those shapes cannot be manufactured using conventional bending machines in the field. Another exemplary benefit is a pipeline designed with the least number of bends while at the same time ensuring a minimum level of ground cover is maintained above the pipeline. Still another exemplary benefit is an accurate determination of the best usage of available "raw material" straight pipe sections to manufacture the pipeline as pipelines are constructed from individual straight lengths of pipe that are bent to the required shape and welded together in the field. A further exemplary benefit allows for the automatic generation of accurate bending instructions for each pipe section to facilitate accurate, right-first time manufacture of curved pipe section in the field. A still further exemplary benefit is the facilitation of accurate digging of a pipeline ditch using GPS-guided excavators to ensure that the manufactured pipeline fits the ditch right-first-time. This exemplary benefit is achieved by automatically generating a 3D model of the bottom of the ditch that the pipeline will sit in and data of the 3D model of the bottom of the ditch profile may then be used to generate guidance instructions for GPS-guided excavators.

A "correctly shaped" pipeline, according to embodiments of the present disclosure, is one that comprises a series of radial (planar) curves, each interconnected by a straight length. The straight lengths are tangential to the curves that they connect to. It follows that each curve has a straight length leading to and from it. The lines of tangency of the straight lengths (i.e., the 3D vectors of the two straight lengths of pipe) always meet at a 3D point in space which is hereinafter referred to as a Point of Intersection ("PI"). The PI is also (always) the tangent point of the curve.

As described by embodiments herein, a design by PI technique is used to design and layout pipelines. The design by PI technique allows the user to specify the pipeline by placing symbols that represent the PIs of a pipeline on the plan and profile views for the pipeline. In certain embodiments, the 3D coordinates of the PIs are deduced from the placement of these symbols where the PI symbol in the plan view defines a Northing ("Y") and an Easting ("X") coordinate (i.e., distances north and east, respectively, from a benchmark position), and the PI symbol in the profile view defines an Elevation ("Z") coordinate (i.e., elevation distance from the benchmark position). In embodiments, properties may also be assigned to one or more of the PIs to further describe the shape of the pipeline. As a non-limiting example, the radius of the curve (synonymous with curvature) at a given PI may be assigned to be a property of that PI. Another non-limiting example of a property of a PI is the type of bend, which may be either a "Tube Turn" (i.e., a pre-fabricated tight bend), or "Bent" (i.e., manufactured by bending on site). Other properties of PIs are discussed below. Those of skill in the art will readily understand that other properties of a PI are contemplated herein.

In an exemplary methodology according to an embodiment, a user may manipulate the placement of the PIs for a pipeline which will cause an embodiment of the disclosed system to automatically compute the shape of the implied pipeline (e.g., in X, Y, and Z coordinates). The system may additionally draw the pipeline in plan and profile views to enable the user to see the implied pipeline path. If the user wishes to change the path of the implied pipeline, the user may simply add, move, or delete one or more PIs and/or alter the properties of one or more PIs rather than drawing/editing the actual path of the pipeline. Thus, the design by PI technique will quickly specify the 3D shape of the pipeline ensuring that the pipeline is always comprised of straight and radially (planar) curved pipe.

In certain embodiments of the disclosed system, the system will automatically check certain design criteria against a set of predetermined rules to ensure that the input received from a user results in a pipeline design and layout that conforms to the predetermined rules. The system may check that these rules are observed at one or more points in the design process.

One of the rules for a pipeline design and layout is that the pipeline be comprised of only straight and radially (planar) curved pipe. Other design rules include, but are not limited to:

Maximum Curvature

The curvature of a bend is expressed as the number of degrees the that bend curves through (radially) per foot of curved pipe (measured along its center line). Curvature is directly proportional to the center radius of the bend (i.e., the radius at its center line). The relationship between curvature and center radius is given by:

$$\text{Curvature: } 180.0/(\pi \times \text{Center Radius})$$

where Center Radius is in units of feet, and Curvature is in units of degrees per ft.

It follows from the above that the greater the curvature, the smaller the radius of the bend, and the smaller the curvature, the greater the radius of the bend.

For a given, pipe diameter and pipe material there is a given maximum curvature that the pipe can be bent through. If the pipe is bent more tightly then damage will result. For this reason the system ensures bends do not exceed the maximum permitted curvature. This rule defines the maximum permitted curvature for each bent bend (it is not applicable to tube turns as they are pre-fabricated and subject to different rules).

Minimum Straight to Pipe Ends

Each bent pipe section must (regardless of the number of bends it contains) have a straight length of pipe at each end of the pipe section. This rule defines the minimum length of straight pipe permitted at each end of the pipe section.

Minimum Straight Between Bends

When a pipe section contains more than one bend, there must be a straight length of pipe between each bend (for example, to ensure that a Pipeline Inspection Gauge ("PIG") can pass through the pipe). This rule defines the minimum length of straight pipe permitted between each consecutive pair of bends on the pipe section.

Minimum Straight Pipe Length

When a pipe section is completely straight (i.e., when it contains no bends), it must not be shorter than the minimum permitted length. This rule defines the minimum permitted length of straight pipe sections.

Minimum Tube Turn Inner Arc Length

When a pipeline contains tube turns (i.e., tightly turning pre-fabricated bought-in bends), the inner arc length of each tube turn must not be shorter than the minimum permitted inner arc length. This rule defines the minimum permitted inner arc length, expressed as a multiple of the pipe radius. For example, if the pipe diameter is 12", then the pipe radius is 6". If the minimum permitted inner arc length is 1.5 then the minimum inner arc length in inches would be 6"×1.5=9".

Those of skill in the art will readily understand that the above list of rules is exemplary and not exhaustive.

With attention drawn to FIG. 1, a method 100 for use of a system and/or software for designing a pipeline according to an exemplary, non-limiting embodiment is shown. At block 102 pipeline survey information of the field conditions for the pipeline is provided from which an initial layout is determined. At block 104, a digital terrain model is determined from the pipeline survey information. At block 106, pipeline design criteria is input. At block 108 a first pipeline layout is determined from the initial pipeline design criteria. At block 110, the system produces a plan and profile view of the proposed pipeline, ground surface, minimum cover levels, ditch widths, pipeline corridor, PI's, top, bottom, and centerline of pipe, etc. based on the pipeline layout from block 108. At block 112 the user selects and modifies one or more PIs in the initially designed pipeline. At block 114 a modified pipeline layout is determined based on the modified PI(s) from block 112. At block 116 pipe length data is input. At block 118 the cut pipe length based on the modified design is calculated. At block 120 a parts list is determined for the designed pipe route. At block 122 the modified pipeline layout is displayed. At block 124 fabrication information for the pipes for the designed pipe route is determined. At block 126 ditch profile information for the profile of the ditch in which the designed pipeline layout will be placed is exported from the system. These steps will be discussed in further detail below.

In an embodiment, the above-described method may further include determining either: a condition where a length of pipe at a point of intersection that is located at an end of the modified pipeline layout is less than a predetermined value; or for the modified pipeline layout which contains no points of intersection, a condition where a length of pipe is less than a predetermined value. In another embodiment, the above-described method may further include determining a condition where a length of pipe between adjacent points of intersection is less than a predetermined value. In yet another embodiment, the above-described method may further include determining a condition where an inner arc of a tube turn is less than a threshold value.

Again considering FIG. 1, a method 100 for use of a system and/or software for designing a pipeline according to an exemplary, non-limiting embodiment is shown. At block 102 pipeline survey information of the field conditions for the pipeline is provided from which an initial layout is determined. The pipeline survey information of the field conditions may include GPS information for the path the proposed pipeline will follow. At block 104, a digital terrain model is determined from the pipeline survey information.

At block 106, pipeline design criteria is input. The initial pipeline design criteria includes, but is not limited to, pipe deflection angles, pipe bend angles, drawing setup information, pipeline layout, rule settings, and pipeline calculations, as described above. Pipeline turns are identified as PIs. An exemplary input screen 200 is shown in FIG. 2 for inputting initial design criteria.

Figure 2:
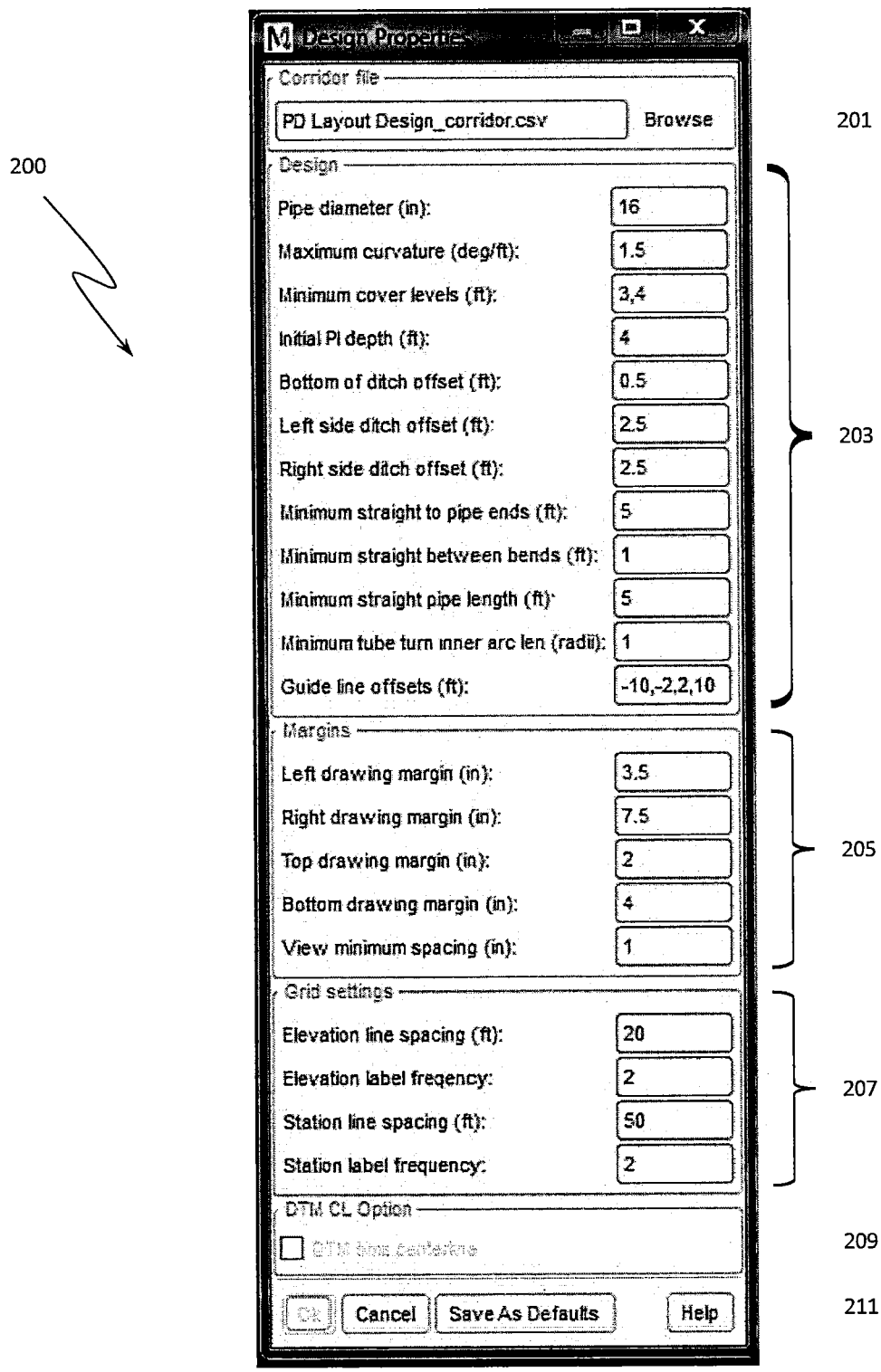
FIG. 2 is an exemplary input screen for inputting initial design criteria according to an embodiment of the present subject matter.

As shown in FIG. 2, section 201 indicates the Corridor file that is being designed and allows for a user to search various Corridor files. Section 203 allows for user input for initial pipeline design criteria, such as pipe diameter, maximum curvature, minimum cover levels (i.e., distance the top of the pipeline is below ground level), initial PI depth, pipeline offsets from the bottom, left side, and right side of the ditch, minimum straight distance of pipe at an end of a pipe section, minimum straight distance of a pipe between bends, minimum distance of a straight pipe length, minimum tube turn inner arc length, and guide line offsets, as can be seen in FIG. 2. Section 205 allows for user input for drawing parameters for the system-produced drawings, such as left, right, top, and bottom drawing margins and minimum view spacing, as listed in FIG. 2. Section 207 allows for input for grid setting for the system-produced drawings, such as elevation and station line spacing and elevation and station label frequency, as shown in FIG. 2. FIG. 2 also includes section 209 which allows a user to toggle a centerline on and off, and section 211 which contains file control buttons, as is known in the art.

Figure 3:
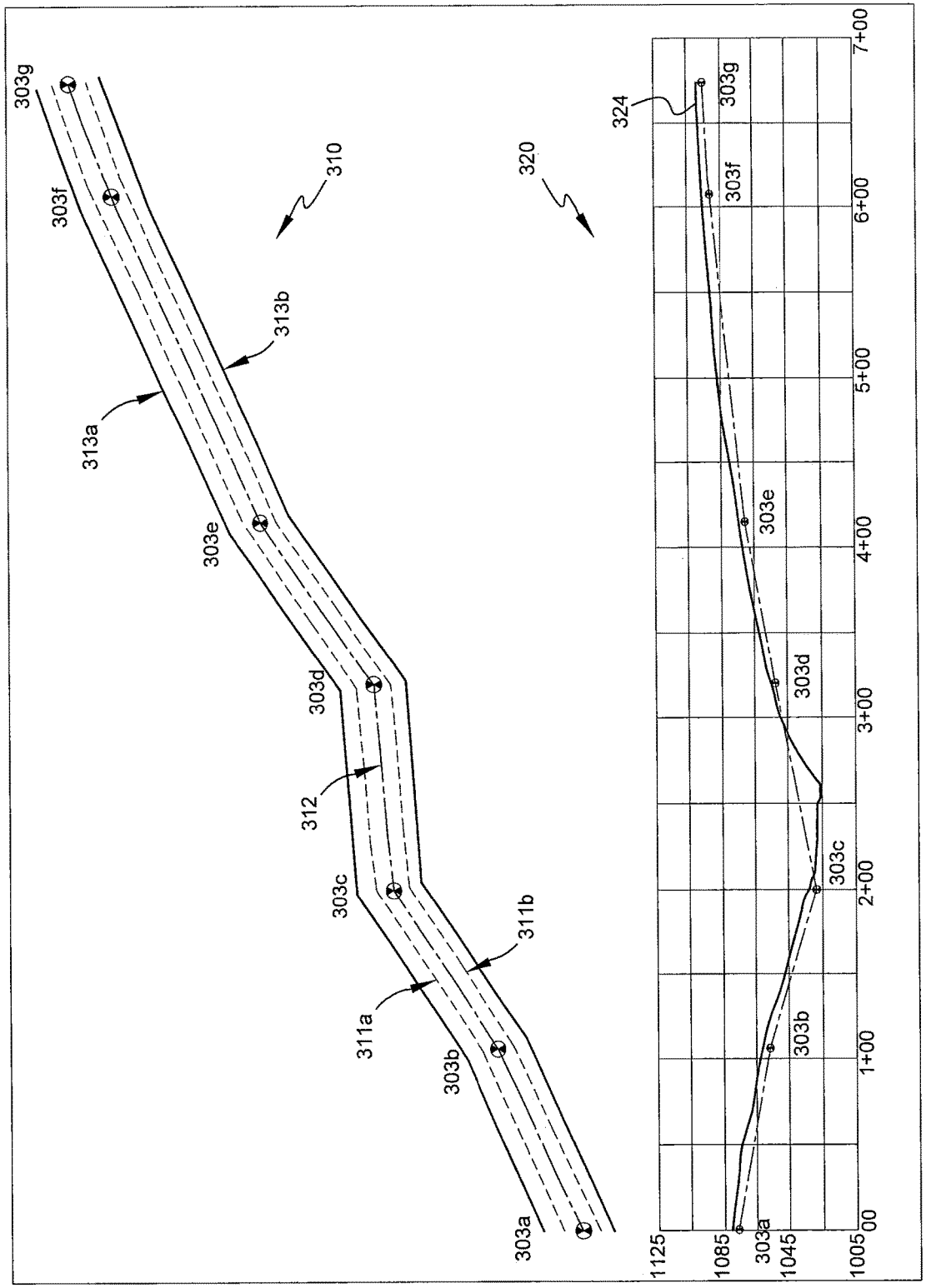
FIG. 3 illustrates simplified sample plan and profile views generated from an exemplary pipeline layout according to an embodiment of the present subject matter.

Returning attention to FIG. 1, at block 108 a first pipeline layout is determined from the initial pipeline design criteria in FIG. 2. The system generates a pipeline path where the pipes are represented by straight lines from one PI to the next so as to minimize the amount of turns/bending required. At block 110, the system produces a plan and profile view of the proposed pipeline, ground surface, minimum cover levels, ditch widths, ditch side lines, pipeline corridor, pipeline side lines, PI's, top, bottom, and centerline of pipe, etc. based on the pipeline layout from block 108. FIG. 3 illustrates a simplified sample plan 310 and profile 320 views generated from the pipeline layout, each showing PIs labeled 303*a* through 303*g*. In plan view 310, lines 311*a* and 311*b* represent the pipes in the initially designed pipeline while line 312 represents the centerline of each pipe in the initially designed pipeline. Lines 313*a* and 313*b* represent the sides of a ditch in which the initially designed pipeline will be laid. In profile view 320, line 324 represents the ground surface above the initially designed pipeline. Note that the pipe is straight between each adjacent set of PIs including the section between PI 303*c* and PI 303*d* where the pipe runs above the ground surface in the initial design. This anomaly will be rectified later in the procedure. The grid that appears in profile view 320 incorporates the grid settings in section 205 of FIG. 2.

At block 112 of FIG. 1, in an embodiment, the user selects and modifies one or more PIs in the initially designed pipeline. Alternatively, the user may enter one or more new PIs that do not currently exist in the initially designed pipeline or remove one or more existing PIs from the initially designed pipeline. In an embodiment, modifying the initially designed pipeline may include at least one of adding a new point of intersection, removing one of the plurality of points of intersection, moving one of the plurality of points of intersection, changing a deflection angle, changing a curvature of a bend, and designating a bend as a factory bend or a field bend.

At block 114, a modified pipeline layout is determined based on the modified PI(s) from block 112. In an embodiment, the modified design information may include at least one of a non-planar curved pipe and a maximum curvature of a pipe that is greater than a predetermined threshold value. In an embodiment, a tool may display the modified pipeline layout as well as design information to allow for the easy manipulation of the pipeline and/or pipeline components in order to maximize the efficiency of the pipeline installation and minimize the amount of turns or bends required. The pipeline may be designed in real time so that impacts of changes made can be seen and evaluated in relation to the design requirements set for the particular project for which the pipeline is being designed. Turns and bends in the pipeline can also be specified as bent pipes or factory bends and deflection data can be input in various forms into the tool to create the exact deflection required.

Figure 4:
FIG. 4 is an exemplary input screen for Point of Intersection ("PI") information according to an embodiment of the present subject matter.

An exemplary input screen 400 is shown in FIG. 4 where the PI number is shown in section 401, location information for the PI is shown in section 403 including northing, easting, elevation distances as well as a bearing and slope from the previous PI. In section 405 deflection angles for the PI are shown including total deflection angle, horizontal deflection angle with left, right, and none radio buttons, and vertical deflection angle with over, sag, and none radio buttons. Section 407 includes bend information for the PI with radio buttons indicating the type of bend (none, bent, or tube-turn), and information about the bend, e.g., curvature, radius, minimum straight portion from section start, and minimum straight portion from section end. Section 409 contains file control buttons, as is known in the art.

Figure 5:
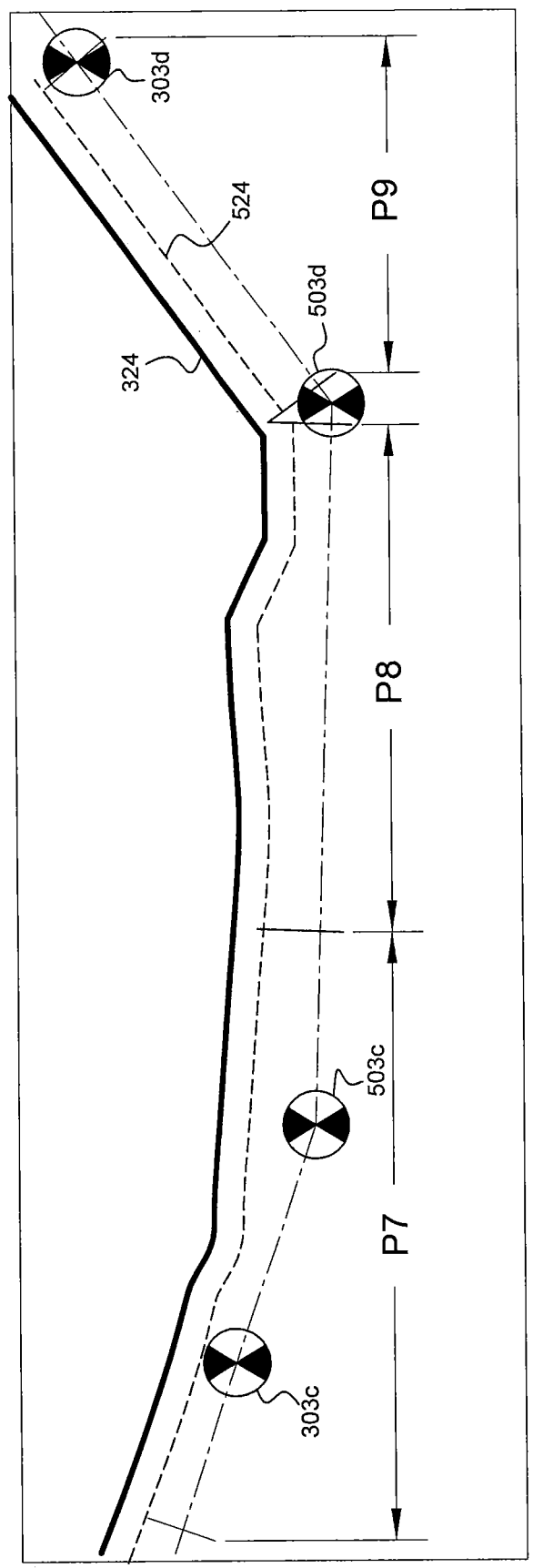
FIG. 5 is an illustration of a portion of an exemplary modified pipeline layout according to an embodiment of the present subject matter.

In an embodiment, a portion of the modified pipeline layout is shown in FIG. 5. FIG. 5 additionally includes line 524 which represents a minimum cover level distance for the pipeline from ground level 324. The minimum cover level distance may be input as required by the type of pipeline (including one or both of the material of the pipeline and the type of fluid that will travel through the pipeline), the type of soil, etc. FIG. 5 represents a portion of profile view 320 in FIG. 3 and shows modifications to the pipeline layout of FIG. 3, where PIs 303c and 303d are the same in both figures. New PIs 503c and 503d have been added so as to reroute the exposed portion of the pipeline between 303c and 303d in FIG. 3. FIG. 5 also shows pipes P7, P8, and P9, which will be discussed below.

Returning to FIG. 1, at block 116 pipe length data is input. In an embodiment, inputting a predetermined length of uncut pipe may include automatically generating an error message if the predetermined length of uncut pipe is less than a minimum pipe length based on, for example, the modified pipeline design layout discussed above. In another exemplary embodiment, pipe length information is entered into a "Pipe Sections" tool as shown in FIG. 6A by exemplary input screen 600A. Section 601 lists raw material (e.g., pipe) attributes for various pipes in section 602 such as uncut length, a name (or number) for a particular pipe, a cut length, and the amount of pipe to be cut off as required for a particular pipeline design (e.g., such as the modified pipeline layout discussed above). Section 603 allows for user input for a specific one of the pipes listed/highlighted in section 602. Section 604 provides a part list for the designed pipeline layout based on the raw material in section 601. In section 604, attributes of items on the parts list include the name (or number) for a particular pipe (the same as the corresponding name in the raw material section 601) the type of pipe (e.g., a straight pipe section, a tube turn, a bend, etc.) and a description of the particular pipe (e.g., length, details of a turn, etc.). Each identified pipe may be listed on a separate line as shown in section 605. Section 606 includes a section for displaying an automatic indication as to whether the pipe layout is successful or not, depending on the design criteria input previously, as discussed above. The particular sections of FIG. 6 will be discussed in further detail below.

Figure 6B:
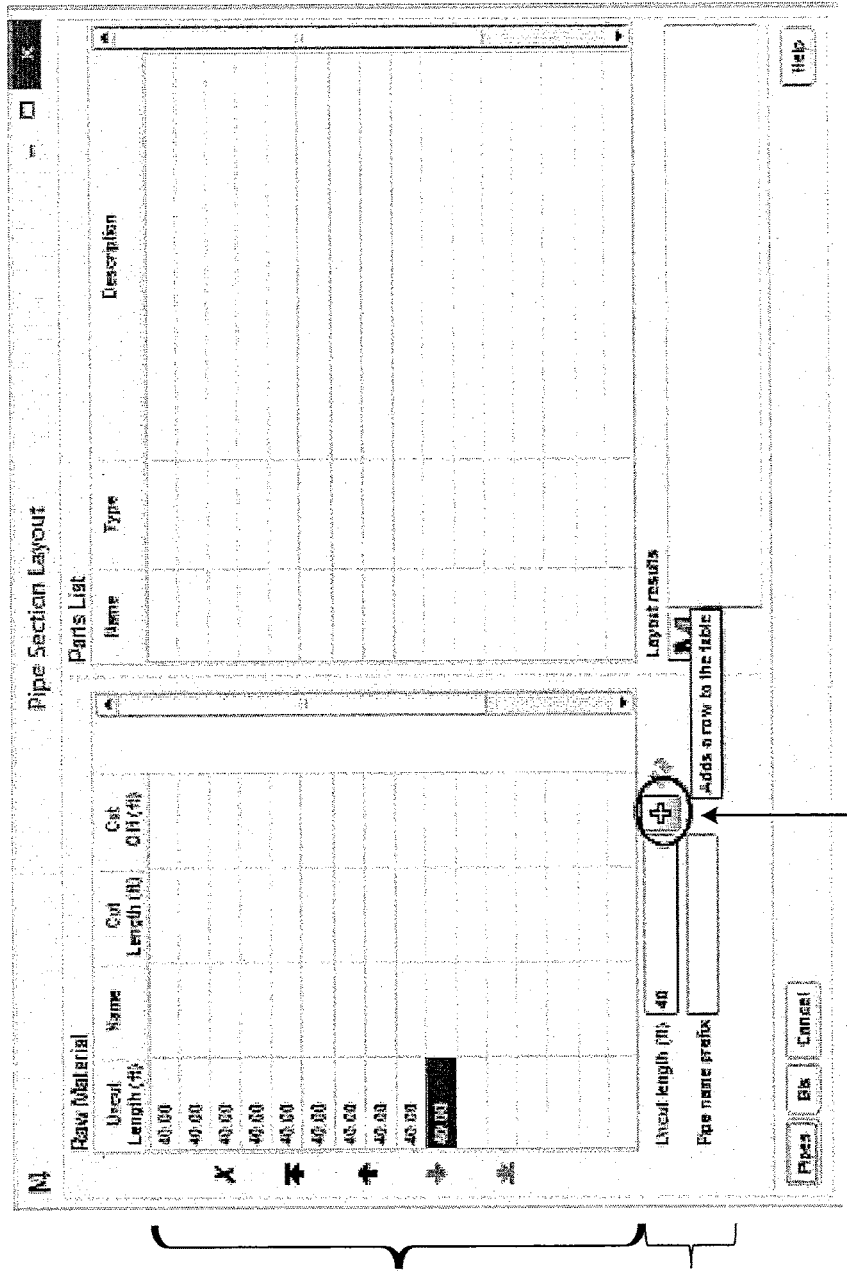
FIGS. 6B-6D represent the exemplary input screen of FIG. 6A at various points in the process according to an embodiment of the present subject matter.
Figure 6C:
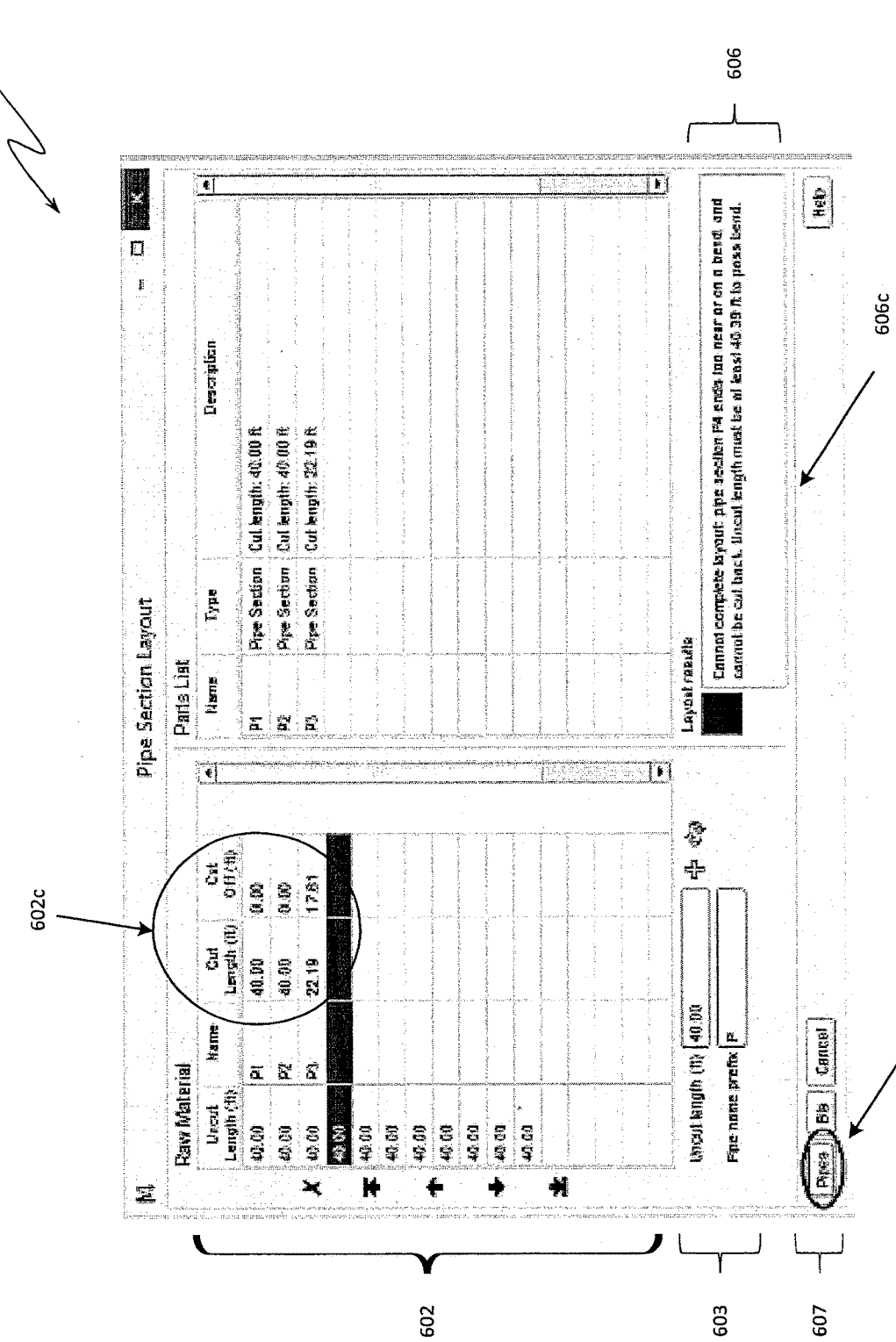
Figure 6D:
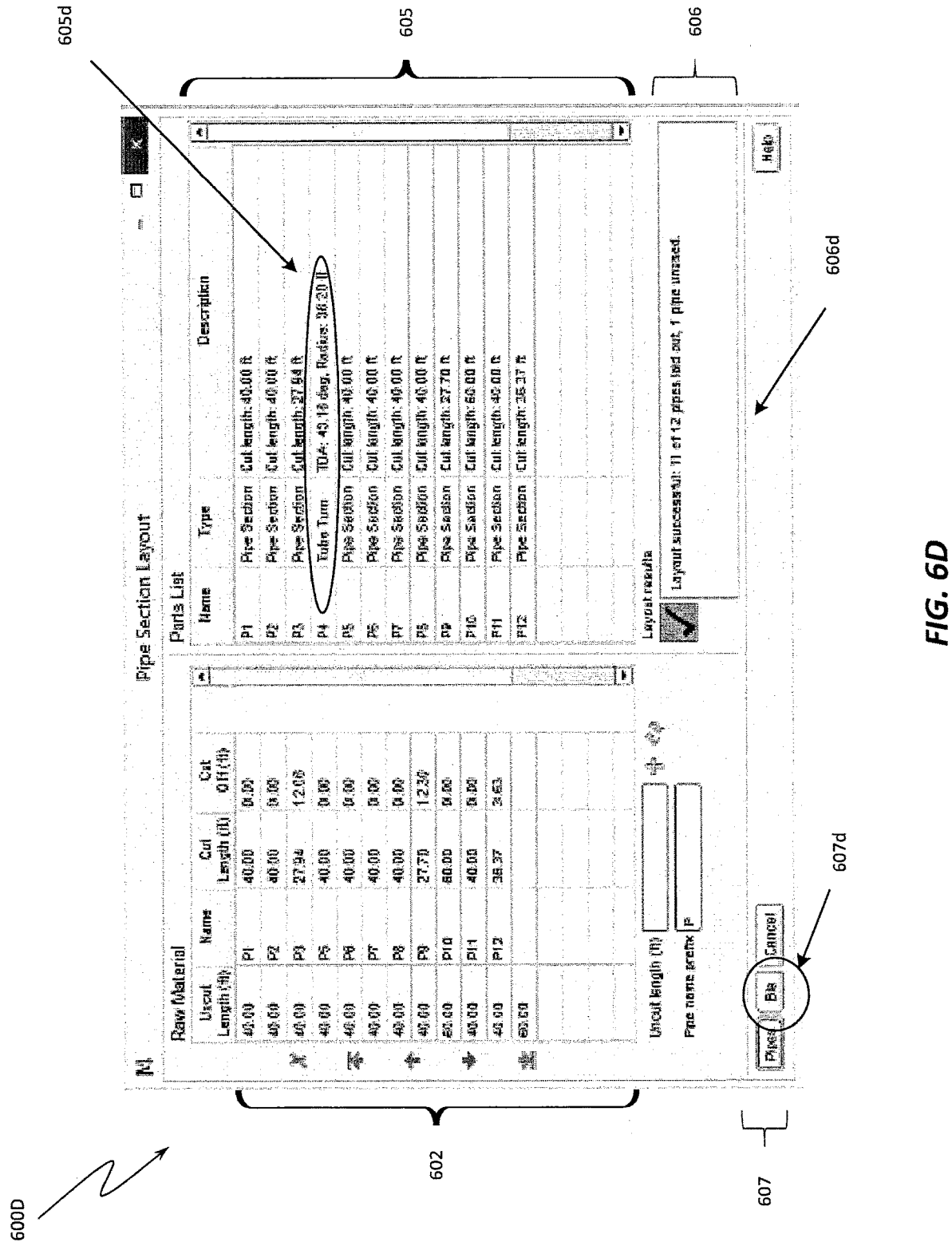

FIGS. 6B-6D represent steps in a non-limiting example of laying out pipe in the designed pipeline based on information entered by a user. Thus, FIGS. 6B-6D represent the same input screen (600B-600D, respectfully) at various points in the process.

FIG. 6B shows an exemplary input screen 600B which is similar to input screen 600A of FIG. 6A. As a non-limiting example, in FIG. 6B, a user may enter pipe information (e.g., uncut pipe length) in section 603 for a predetermined pipeline design (e.g., the modified pipeline layout discussed above) and click on the "+" button 603b to add as many uncut pipe lengths as desired. Clicking on the "+" button will add a pipe of the desired uncut length into a new row in section 602 as shown in FIG. 6B.

Returning briefly to FIG. 1, at block 118 the cut pipe length based on the modified design is calculated. In an embodiment, in FIG. 6C, after entering a number of uncut pipe lengths, the user may enter a pipe name prefix in section 603 for one or more of the pipe lengths entered in section 602 and click the "Pipes" button 607c. The system will automatically lay out the pipe sections having a pipe name prefix along the pipe route designed above. The system also labels the designed pipeline layout with the pipe name prefix and indicates start and stop points for each pipe. An example of this is shown in the pipe layout in FIG. 5 as P7, P8, and P9 (note that P7, P8, and P9 in FIG. 5 represent a different example than the example for P1, P2, and P3 in FIGS. 6A-6D). Additionally, the system will automatically show any pipe cut lengths, as seen at 602c, based on the designed pipe route. If the pipe lengths having pipe name prefixes are not adequate to complete the designed pipe route, an error message 606c will appear in section 606, such as the exemplary error message shown in FIG. 6C.

Again returning briefly to FIG. 1, at block 120 a parts list is determined for the designed pipe route (such as the modified pipeline lineout discussed above).

With attention drawn to FIG. 6D, if the pipe lengths having pipe name prefixes are adequate to complete the designed pipe route, a success message 606d will appear in section 606, such as the exemplary success message shown in FIG. 6D. Additionally, the parts list (section 605) is populated with the name/name prefix of the pipe, the type of pipe, and a description of the pipe. Additionally, as shown at 605d, tube turn information is displayed based on the designed pipe route. Note that in FIG. 6D, only P1 through P12 listed in section 602 are listed in the part list section 605.

Returning to FIG. 1, at block 122 the modified pipeline layout is displayed. This is shown, as discussed above, in FIG. 5. At block 124 fabrication information for the pipes for the designed pipe route is determined. Referring to FIG. 6d, in an embodiment, when the user clicks the "BI" (Bending Instructions) button 607d, the system computes, based on the pipe lengths and the designed pipe route input into the system, pipe bending information, factory bend data, fabrication details and outputs this information into a text file. This text file may then be used, for example, in the field to fabricate the pipe layout and turns to match the designed pipe route. The fabrication details in the text file may also include pertinent information on how pipe sections are to be rotated or if factory fittings are to be installed in line, e.g., the size of the fittings, angles required, etc.

A portion of an exemplary output text file is shown in FIG. 7 where for this example sections 711-715 include the fabrication details for Pipes 1-5, respectively. In section 711, Pipe 1 is a straight pipe of raw length 42.2 ft. which is cut down to 36.07 ft. In section 712, Pipe 2 has a raw length of 42.4 ft. and is not cut down, i.e., the cut length is the same as the raw length. However, Pipe 2 has two bends (denoted "Bend No: 1" and "Bend No: 2" as seen in FIG. 7) and section 712 includes the fabrication details for those bends, e.g., bend center, measure direction, measure distance, center bend radius, center curvature, total deflection angle, horizontal deflection angle, and vertical deflection angle. In section 713, Pipe 3 has a raw and cut length of 41.80 ft. and includes one bend. In section 714, Pipe 4 has a raw and cut length of 41.90 ft. and is a straight pipe. In section 715, Pipe 5 has a raw length of 42.10 ft. and a cut length of 31.39 ft. and is a straight pipe. Each pipe in the designed pipeline layout would have fabrication information included in the output text file.

Returning to FIG. 1, at block 126 ditch profile information for the profile of the ditch in which the designed pipeline layout will be placed is exported from the system. The ditch profile information may include, but is not necessarily limited to, GPS information for the ditch and may include information for the bottom of the ditch. This ditch profile information may be used by a ditch excavation tool to manually or automatically excavate the ditch to match the designed pipeline layout.

Figure 8:
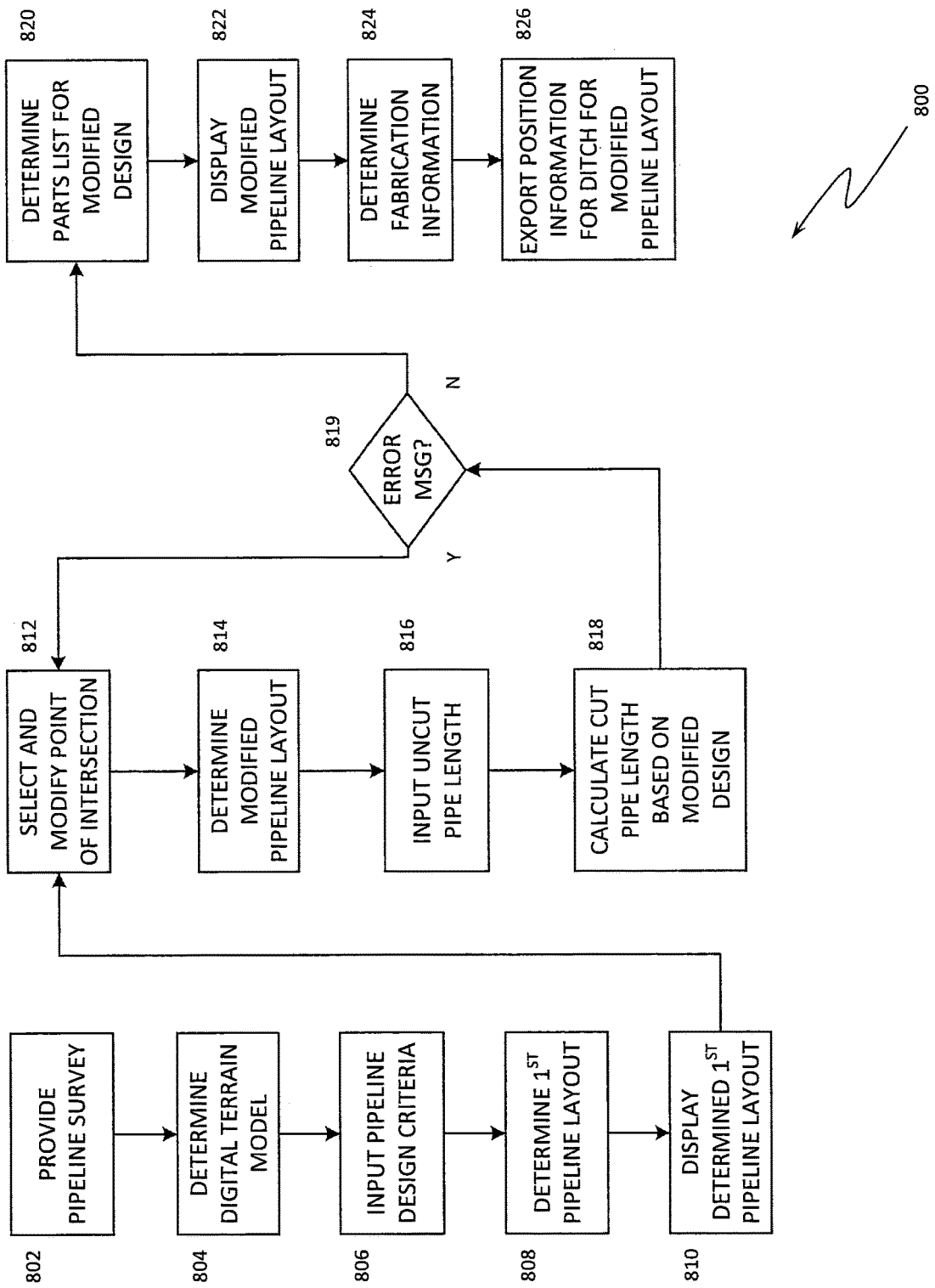
FIG. 8 is a flow chart for another method for designing a pipeline layout according to an embodiment of the present subject matter.

Considering FIG. 8, an embodiment for a method 800 for use of a system and/or software for designing a pipeline according to an exemplary, non-limiting embodiment is shown. Blocks 802 through 818 correspond to blocks 602 through 618, respectively, as discussed above. Blocks 820 through 826 correspond to blocks 620 through 626, respectively, as discussed above. At block 802 pipeline survey information of the field conditions for the pipeline is provided from which an initial layout is determined. At block 804, a digital terrain model is determined from the pipeline survey information. At block 806, pipeline design criteria is input. At block 808 a first pipeline layout is determined from the initial pipeline design criteria. At block 810, the system produces a plan and profile view of the proposed pipeline, ground surface, minimum cover levels, ditch widths, pipeline corridor, PI's, top, bottom, and centerline of pipe, etc. based on the pipeline layout from block 808. At block 812 the user selects and modifies one or more PIs in the initially designed pipeline. At block 814 a modified pipeline layout is determined based on the modified PI(s) from block 812. At block 816 pipe length data is input. At block 818 the cut pipe length based on the modified design is calculated. At block 819, if, as discussed above, an error message appears such as exemplary error message 606c in FIG. 6C, the method may return to block 812 for the user to select and modify another PI. If, at block 819, a success message appears in section 606d in FIG. 6D, the method may continue to block 820. At block 820 a parts list is determined for the designed pipe route. At block 822 the modified pipeline layout is displayed. At block 824 fabrication information for the pipes for the designed pipe route is determined. At block 826 ditch profile information for the profile of the ditch in which the designed pipeline layout will be placed is exported from the system.

Figure 9:
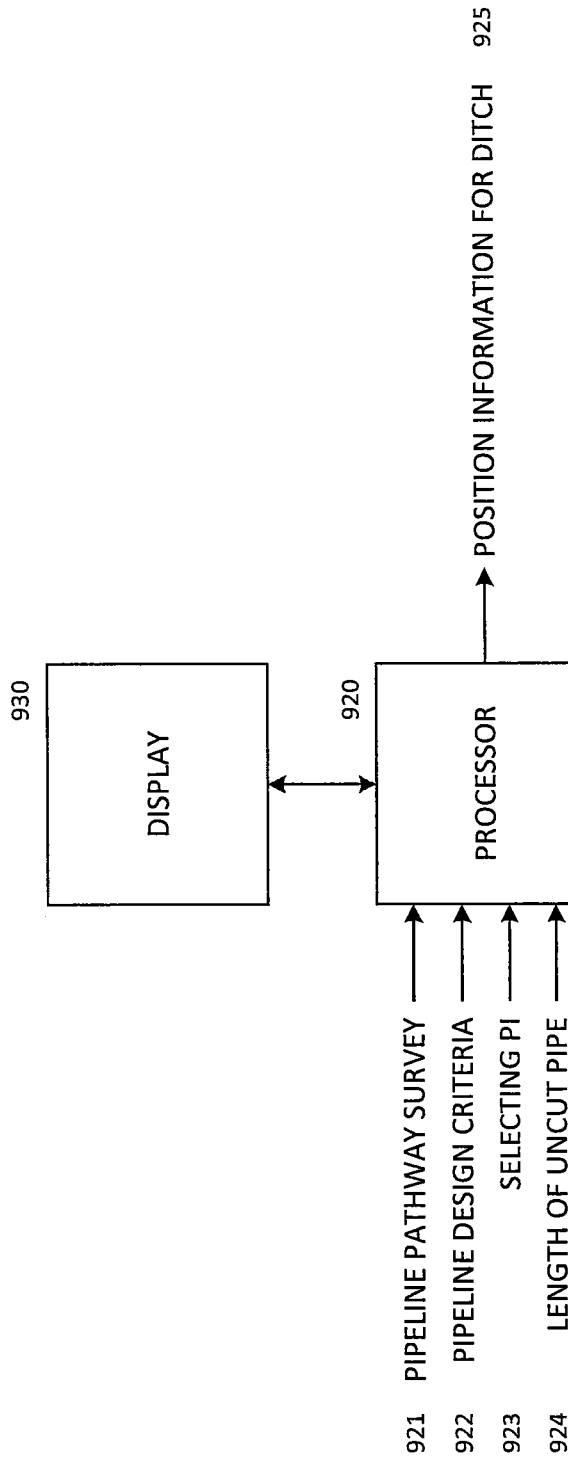
FIG. 9 is a functional block diagram for an exemplary system for designing a pipeline layout according to an embodiment of the present subject matter.

FIG. 9 shows an exemplary system for designing a pipeline including a processor 920 and a display device 930. In an embodiment, the processor 920 includes first input circuitry for receiving a survey of a pipeline pathway 921 and the processor determines a digital terrain model from the received survey. The processor 920 further includes second input circuitry for inputting to said processor a set of pipeline design criteria 922. The processor 920 determines a first pipeline layout based on the digital terrain model and the pipeline design criteria. The first pipeline layout includes one or more points of intersection for the pipeline layout where each of the points of intersection includes first design information for a respective portion of the first pipeline layout. The exemplary system also includes an electronic display device 930 for displaying at least one of a plan view and a profile view of the determined first pipeline layout, where the displayed first pipeline layout includes the one or more points of intersection, and where the first pipeline layout includes straight line pipe sections between each pair of adjacent points of intersection. The processor 920 further includes third input circuitry for selecting one of the one or more points of intersection 923 and modifying the first design information for the respective portion of the first pipeline layout. The processor 920 also automatically determines a modified pipeline layout based on the first pipeline layout and the modified design information. The processor 920 further includes fourth input circuitry for inputting to the processor a predetermined length of an uncut pipe from which the processor automatically calculates a cut length for the uncut pipe based on the modified design information. The processor 920 additionally automatically determines a parts list including one or more pipes for the modified pipeline layout based on the modified design information. The electronic display device 930 displays at least one of a plan view and a profile view of the modified pipeline layout where the displayed modified pipeline layout includes a label for each of the one or more pipes for the modified pipeline layout. The processor 920 automatically determines fabrication information for each of the one or more pipes in the modified pipeline layout, and the processor includes output circuitry for exporting position information relating to a ditch 925 for the modified pipeline layout.

Certain embodiments of the present disclosure may be implemented by a computer programmed in accordance with the principals discussed herein. It may be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and protected by the following claims.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer readable medium. The computer readable medium can be a machine-readable storage device, a machine-readable storage substrate, a memory device, or a combination of one or more of them.

To provide for interaction with a user, embodiments of the subject matter described in this specification can be implemented on a computer having a display device, e.g., a cathode ray tube (CRT), a light emitting diode (LED) display monitor, a liquid crystal display (LCD) monitor, etc., as is known in the art for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

While some embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What is claimed is:

1. A method for designing a pipeline, the method comprising the steps of:
   (a) providing a survey of a pipeline pathway;
   (b) determining, using a processor, a digital terrain model from the survey;
   (c) inputting to the processor a set of pipeline design criteria;
   (d) determining, using the processor, a first pipeline layout based on the digital terrain model and the pipeline design criteria, including a plurality of points of intersection for the pipeline layout wherein each of the points of intersection includes first design information for a respective portion of the first pipeline layout;
   (e) displaying at least one of a plan view and a profile view of the determined first pipeline layout on an electronic display device, wherein the displayed first pipeline layout includes the plurality of points of intersection, and wherein the first pipeline layout comprises straight line pipe sections between each pair of adjacent points of intersection;
   (f) selecting one of the plurality of points of intersection and modifying, using the processor, the first design information for the respective portion of the first pipeline layout;
   (g) automatically determining, using the processor, a modified pipeline layout based on the first pipeline layout and the modified design information;
   (h) inputting to the processor a predetermined length of an uncut pipe;
   (i) automatically calculating, using the processor, a cut length for the uncut pipe based on the modified design information;
   (j) automatically determining, using the processor, a parts list including a plurality of pipes for the modified pipeline layout based on the modified design information;
   (k) displaying at least one of a plan view and a profile view of the modified pipeline layout on the electronic display device, wherein the displayed modified pipeline layout includes a label for each of the plurality of pipes for the modified pipeline layout;
   (l) automatically determining, using the processor, fabrication information for each of the plurality of pipes in the modified pipeline layout; and
   (m) exporting position information relating to a ditch for the modified pipeline layout.

2. The method of claim 1 wherein the displaying of the determined pipeline layout includes displaying at least one of a top of ground line, a minimum cover level line, a ditch side line, and a corridor side line.

3. The method of claim 1 wherein the first design information includes at least one of a deflection angle for the first pipeline layout and a bend angle for the first pipeline layout.

4. The method of claim 1 wherein the step of modifying the first design information includes at least one of adding a new point of intersection, removing one of the plurality of points of intersection, moving one of the plurality of points of intersection, changing a deflection angle, changing a curvature of a bend, and designating a bend as a factory bend or a field bend.

5. The method of claim 1 wherein the step of inputting to the processor a predetermined length of uncut pipe includes automatically generating an error message for the condition where the predetermined length of uncut pipe is less than a minimum pipe length based on the modified design information.

6. The method of claim 1 wherein the modified design information includes at least one of a non-planar curved pipe and a maximum curvature of a pipe that is greater than a threshold value.

7. The method of claim 1 further comprising the step of determining either:
   (i) a condition where a length of pipe at a point of intersection that is located at an end of the modified pipeline layout is less than a predetermined value; or
   (ii) for the modified pipeline layout which contains no points of intersection, a condition where a length of pipe is less than a predetermined value.

8. The method of claim 1 further comprising the step of determining a condition where a length of pipe between adjacent points of intersection is less than a predetermined value.

9. The method of claim 1 further comprising the step of determining a condition where an inner arc of a tube turn is less than a threshold value.

10. A system for designing a pipeline, the system comprising:
    first input circuitry for receiving a survey of a pipeline pathway;
    a processor for determining a digital terrain model from the survey;
    second input circuitry for inputting to said processor a set of pipeline design criteria;
    said processor for determining a first pipeline layout based on the digital terrain model and the pipeline design criteria, including a plurality of points of intersection for the pipeline layout wherein each of the points of intersection includes first design information for a respective portion of the first pipeline layout;
    an electronic display device for displaying at least one of a plan view and a profile view of the determined first pipeline layout, wherein the displayed first pipeline layout includes the plurality of points of intersection, and wherein the first pipeline layout comprises straight line pipe sections between each pair of adjacent points of intersection;
    third input circuitry for selecting one of the plurality of points of intersection and modifying, using the processor, the first design information for the respective portion of the first pipeline layout;
    said processor for automatically determining a modified pipeline layout based on the first pipeline layout and the modified design information;

fourth input circuitry for inputting to said processor a predetermined length of an uncut pipe;

said processor for automatically calculating a cut length for the uncut pipe based on the modified design information;

said processor for automatically determining a parts list including a plurality of pipes for the modified pipeline layout based on the modified design information;

said electronic display device for displaying at least one of a plan view and a profile view of the modified pipeline layout on the electronic display device, wherein the displayed modified pipeline layout includes a label for each of the plurality of pipes for the modified pipeline layout;

said processor for automatically determining fabrication information for each of the plurality of pipes in the modified pipeline layout; and output circuitry for exporting position information relating to a ditch for the modified pipeline layout.

11. The system of claim 10 wherein the displaying of the determined pipeline layout includes displaying at least one of a top of ground line, a minimum cover level line, a ditch side line, and a corridor side line.

12. The system of claim 10 wherein the first design information includes at least one of a deflection angle for the first pipeline layout and a bend angle for the first pipeline layout.

13. The system of claim 10 wherein the modifying of the first design information includes at least one of adding a new point of intersection, removing one of the plurality of points of intersection, moving one of the plurality of points of intersection, changing a deflection angle, changing a curvature of a bend, and designating a bend as a factory bend or a field bend.

14. The system of claim 10 wherein the inputting to said processor a predetermined length of uncut pipe includes automatically generating an error message for the condition where the predetermined length of uncut pipe is less than a minimum pipe length based on the modified design information.

15. The system of claim 10 wherein the modified design information includes at least one of a non-planar curved pipe and a maximum curvature of a pipe that is greater than a threshold value.

16. The system of claim 10 wherein said processor determines either:
  (i) a condition where a length of pipe at a point of intersection that is located at an end of the modified pipeline layout is less than a predetermined value; or
  (ii) for the modified pipeline layout which contains no points of intersection, a condition where a length of pipe is less than a predetermined value.

17. The system of claim 10 wherein said processor determines a condition where a length of pipe between adjacent points of intersection is less than a predetermined value.

18. The system of claim 10 wherein said processor determines a condition where an inner arc of a tube turn is less than a threshold value.

19. A non-transitory machine-readable medium having stored thereon a plurality of executable instructions for designing a pipeline, the plurality of executable instructions comprising instructions to:

receive input regarding a survey of a pipeline pathway;
determine a digital terrain model from the survey;
receive input regarding a set of pipeline design criteria;

determine a first pipeline layout based on the digital terrain model and the pipeline design criteria, including a plurality of points of intersection for the pipeline layout wherein each of the points of intersection includes first design information for a respective portion of the first pipeline layout;

display at least one of a plan view and a profile view of the determined first pipeline layout on an electronic display device, wherein the displayed first pipeline layout includes the plurality of points of intersection, and wherein the first pipeline layout comprises straight line pipe sections between each pair of adjacent points of intersection;

select one of the plurality of points of intersection and modifying the first design information for the respective portion of the first pipeline layout;

determining a modified pipeline layout based on the first pipeline layout and the modified design information;

receive input regarding a predetermined length of an uncut pipe;

calculate a cut length for the uncut pipe based on the modified design information;

determine a parts list including a plurality of pipes for the modified pipeline layout based on the modified design information;

display at least one of a plan view and a profile view of the modified pipeline layout on the electronic display device, wherein the displayed modified pipeline layout includes a label for each of the plurality of pipes for the modified pipeline layout;

determine fabrication information for each of the plurality of pipes in the modified pipeline layout; and export position information relating to a ditch for the modified pipeline layout.

20. The non-transitory machine-readable medium of claim 19 wherein the displaying of the determined pipeline layout includes displaying at least one of a top of ground line, a minimum cover level line, a ditch side line, and a corridor side line.

21. The non-transitory machine-readable medium of claim 19 wherein the first design information includes at least one of a deflection angle for the first pipeline layout and a bend angle for the first pipeline layout.

22. The non-transitory machine-readable medium of claim 19 wherein the modifying the first design information includes at least one of adding a new point of intersection, removing one of the plurality of points of intersection, moving one of the plurality of points of intersection, changing a deflection angle, changing a curvature of a bend, and designating a bend as a factory bend or a field bend.

23. The non-transitory machine-readable medium of claim 19 wherein the inputting to the processor a predetermined length of uncut pipe includes automatically generating an error message for the condition where the predetermined length of uncut pipe is less than a minimum pipe length based on the modified design information.

24. The non-transitory machine-readable medium of claim 19 wherein the modified design information includes at least one of a non-planar curved pipe and a maximum curvature of a pipe that is greater than a threshold value.

25. The non-transitory machine-readable medium of claim 19 wherein the plurality of executable instructions further comprises instructions to determine either:
  (i) a condition where a length of pipe at a point of intersection that is located at an end of the modified pipeline layout is less than a predetermined value; or (ii) for the modified pipeline layout which contains no points of intersection, a condition where a length of pipe is less than a predetermined value.

26. The non-transitory machine-readable medium of claim 19 wherein the plurality of executable instructions further comprises instructions to determine a condition where a length of pipe between adjacent points of intersection is less than a predetermined value.

27. The non-transitory machine-readable medium of claim 19 wherein the plurality of executable instructions further comprises instructions to determine a condition where an inner arc of a tube turn is less than a threshold value.

\* \* \* \* \*